CURIE POINT MAGNETIC RECORDING PROCESS

Filed Feb. 15, 1965

INVENTORS:
JOACHIM GREINER, WOLFGANG EICHLER, FRIEDRICH KRONES.
BY
Connolly and Hutz
their ATTORNEYS United States Patent Office 3,364,496
Patented Jan. 16, 1968

3,364,496

CURIE POINT MAGNETIC RECORDING PROCESS

Joachim Greiner, Wolfgang Eichler, and Friedrich Krones, Leverkusen, Germany, assignors to Agfa Aktiengesellschaft, Leverkusen, Germany, a corporation of Germany Filed Feb. 15, 1965, Ser. No. 432,796
Claims priority, application Germany, Feb. 29, 1964, A 45,360
8 Claims. (Cl. 346—74)

Figure 1:
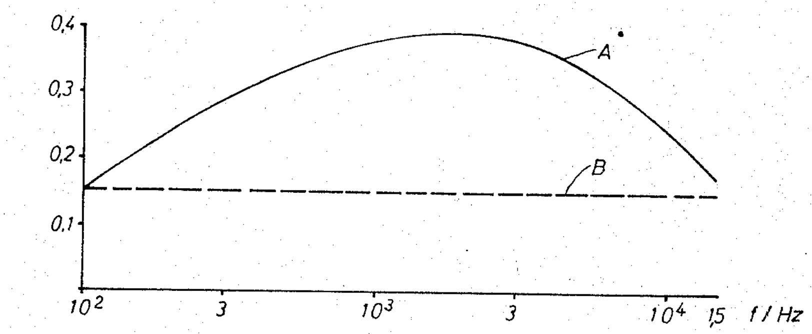

The invention relates to a process for recording or copying information onto magnetic supports.

In connection with the magnetic recording of signals, it is generally known to apply a so-called idealizing high-frequency premagnetization or bias in order to improve the sensitivity, that is to say, to obtain a higher remanent magnetization with the same field intensity of the recording field. However, a high-frequency premagnetization has various disadvantages, for example, the high-frequency field is also stored. This leads to disturbing differential tones, especially with an overmodulation of the recording.

When recording in practice, an additional disadvantage is that the magnetic material of the recording and erasing heads in the usual apparatus, can be given remanent magnetism.

Furthermore, the magnetic material of the recording and erasing heads intensifies the effect of external disturbing fields, for example, the unidirectional field of the earth, so that screening housings are necessary for the heads.

With special magnetic recording processes, especially when magnetizable materials with a sharply clipped hysteresis loop are used, it is a disadvantage that very high fields are required for the premagnetization necessary in order to obtain the saturation remanence.

It is among the objects of the present invention to provide an improved magnetic recording method.

It has now been found that the sensitivity of magnetizable materials can be very greatly increased by heating the magnetizable recording material up to the Curie point $T_c$, or advantageously to a temperature above the Curie point, subjecting the material to the magnetic recording field and cooling the material down to a temperature below the Curie point while under the action of the recording magnetic field.

From measuring the copying effect on magnetic materials, it was known that the copying effect increases with rising temperature. From this fact, it would be expected that the sensitivity of magnetic materials with reference to a recording field would increase with rising temperature. The copying action, which in any case is very slight, depends essentially on the time of contact and substantially disappears after separation of the original and the copy.

The present invention is based on the unexpected discovery that the sensitivity to copying shows a sudden increase on heating up to the Curie point or higher, which increase leads to a sensitivity stronger by several orders of magnitude than that which is produced by heating to temperatures which are far below the Curie point. The intensity of the signal copied when using the present process shows practically no decrease with storage of the copy.

As already stated above, it is preferred to heat to beyond the Curie temperature, the effect according to the invention occurring upon cooling from the paramagnetic condition above the Curie point to the ferromagnetic state below the Curie point under the action of the recording field.

For the method of the invention, it is preferred to use those magnetic materials which have Curie points approximately between 50 and 250° C. Materials with a Curie point between approximately 60 and 120° C. are particularly suitable.

Technical magnetic recording tapes generally have a magnetisable layer that contains a material dispersed in a film-forming binder on a plastic support. Since both the binder for the magnetisable layer and the support only have a limited temperature stability, so that generally such materials are only stable up to about 150° C., it is only possible when using such materials to employ those magnetisable substances which have a Curie temperature in the above 60 to 120° C. range.

The essential distinction from the known recording and copying processes is that the magnetic recording to copying material is transformed, by heating to above the Curie point, into a condition at which the interaction between the atoms disappears (paramagnetic condition) and that the material is magnetized by the recording field during subsequent cooling.

It is a preferred embodiment of the present invention to use chromium dioxide as the magnetizable material for the magnetic recording. Both pure chromium dioxide and also more especialy modified chromium dioxide are suitable. By the term modified chromium dioxide there is understood products of which the magnetic properties have been varied by adding other substances. Such products are described in British patent specifications 859,937, 877,734, 932,678, 824,323, 878,421 and U.S. Patents 3,074,778, 3,078,147 or 3,117,093 and Belgian Patents Nos. 650,936 and 651,612.

The magnetic signals recorded by the process of the invention show another surprising property, namely that recorded signals are substantially more difficult to erase by the known erasing processes than those recordings which have been obtained in conventional manner with the aid of premagnetization.

One special use of the process according to the invention is the production of contact sound copies.

The recording process according to the invention can be outlined as follows:

The magnetic recording material is heated to above the Curie point. Thereafter the heated recording material while being kept at a temperature above the Curie point is subjected to the magnetic recording field, where it is cooled while under the action of the magnetic recording field and thereby magnetized.

It is possible for this purpose to use an annular recording head of the usual design, except that a heat-insulating foil (e.g. a mica wafer or polyester foil) is positioned in the front and rear gaps of the recording head. One of the arms is heated to about 100° C., while the other is kept at room temperature. The heat can be supplied and discharged by using metal parts in known manner. For heating the magnetic recording material, it is also possible to use any kind of radiation, for example, light or infra-red radiation, it being possible to produce a steep decrease in the temperature by means of diaphragms.

With magnetic recording materials, in particular magnetic recording tapes containing a magnetic layer which is electrically conducting, the heating can be effected by conducting an electric current through the magnetic record carrier. In this case, the annular head described hereinbefore and having insulating gap inserts can be used. In this case, the two magnetically metallic arms are each connected to one terminal of a high-frequency source. Since the surface of contact between the annular recording head and magnetic tape is about 1,000 times larger than the cross-section of the electrically conducting layer of the tape, the said layer will only be heated at the point of current constriction over the gap. In the cooling zone, the tape is magnetised by the magnetic recording field generated in the usual way while passing the front gap. A magnetic recording with a very low distortion factor is obtained. A device ensures that the magnetic record tape is only contacting the hot parts of the recording device while it is moving.

If desired, it would be possible additionally to apply a premagnetising direct and/or alternating field in the inventive process.

Instead of magnetic recording devices which comprise conventional recording and erasing heads with a magnetic core it is also possible to use as recording device a highly heated wire (heated, for example, by a high-frequency current) through which the recording current is flowing. The magnetic record carrier is moved past this wire and thus is magnetized by the field of the wire.

One of the main disadvantages of the known magnetic recording processes is that they are not suitable for copying or printing of magnetic signals. Indirect copying is uneconomic because of the costly play-back machines necessary, so that it has so far been impossible for records to be replaced by magnetic recording tapes.

In connection with the contact copying process, it has so far been impossible to copy satisfactorily the short wavelengths. This is also true when the copying is assisted by a high-frequency alternating field, since also in this case the copied signal is substantially weaker than the original signal which is to be copied.

The process of the invention is in particular advantageous as a method for copying or printing acoustic magnetic signals and the procedure adopted is as follows:

The magnetic layer of the magnetic recording tape which carries the original recordings is brought into close contact with the magnetizable layer of the magnetic recording tape onto which the signal is to be copied. It is essential, of course, that the magnetizable layer of the magnetic recording tape carrying the original signal contains a magnetic material of which the Curie temperature is higher than that of the magnetic copying tape. The tapes while kept in contact are heated to a temperature which is above or which corresponds to the Curie point of the magnetizable material of the magnetic recording tape onto which the original signal is to be copied. Cooling then takes place at the point of contact.

During this cooling, the magnetic material of the heated tape is converted from the paramagnetic to the ferromagnetic state in accordance with the magnetic recording field generated by the original signal on the original magnetic tape. Since it is only possible with difficulty also to keep the original from being heated, a material having a high Curie temperature, e.g., 500–700° C., is chosen for the magnetizable layer of the original tape, so that the original recording is modified only slightly by the heating, and at most during the production of the first copy. A substance of which the Curie temperature is in the range between 50 and 250° C. is used for the magnetizable layer of the printing or copying material into which the signal is copied.

The process of the invention is illustrated in the accompanying figures wherein:

FIG. 1 is a graph which represents plots of the magnetic flux of the original tape (curve B) and the magnetic flux of the copy (curve A) against the signal frequency. The ordinates are relative quantities of magnetic flux and the abscissas give the signal frequency in Hz-units (cycles per second).

The results shown in FIGURE 1 are obtained as follows: An original tape carrying an acoustic signal having the same intensity in the frequency range of $10^2$ cycles per second to about $10^4$ cycles per second was produced. This signal represented by curve B is copied onto a copying tape as described hereinbefore.

The intensity of the signal copied on the copying tape is measured in a conventional magnetic tape recording device. Curve A shows the unexpected result that the copied signal is more intense than the original signal.

Figure 2:
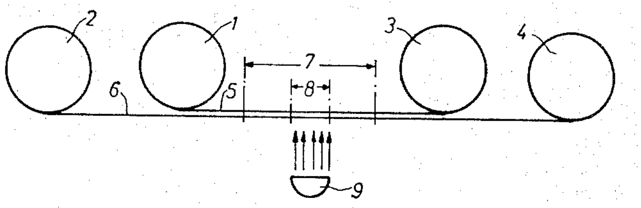

FIG. 2 illustrates a scheme of a preferred copying device, wherein the copying process is performed continuously. The original tape 5 and copying tape 6 are wound off the supply reels 1 and 2 so that the magnetizable layers of both tapes are brought into contact. The tapes while being kept in close contact are passed through the heated zone 8. The heating is accomplished by means of an infra-red source 9. Thereafter the tapes are wound onto the take-up reels 3 and 4. In the copying process care should be taken that the magnetizable layers are kept in close contact and that no displacement occurs in the range designated by 7 in FIGURE 2.

The inventive process lends itself readily to a number of useful modification in method, material and apparatus. For example, the heating in some cases might be more economic with hot surfaces.

Radiation sources (infra-red radiators, incandescent lamps, etc.) are advantageous in other respects, since they only have to be brought into operation with the beginning of the copying process. The conveying speed of the tapes and the heat intensity can be matched to one another.

With the copying process according to the invention, the effect of the heat energy can be assisted by magnetic and/or mechanical energy. This will more especially be the case when the temperature resistance of the support and magnetic layer prohibits heating up to the Curie point.

If the copying action is assisted by magnetic direct and/or alternating fields, it is desirable to give preferential magnetic axes to the magnetizable particles of the original tape and to the copying tape, the said axes being perpendicular to one another. The magnetic field can then be so developed that it influences substantially only the copying tape. The copying action can be intensified mechanically by drawing the original tape and copying tape over a sharp, heated edge. The rear side of the copying tape in this case contacts the edge.

Recordings which are difficult to erase magnetically can be produced according to the invention by using tapes which contain a magnetizable material of high coercive force and/or a strongly clipped hysteresis loop. Particularly desirable are magnetisable materials of which the saturation remanence, when only magnetic fields are active, is reached only with field intensities higher than 1000 oe.

*Example*

A signal is recorded onto a magnetic recording tape, consisting of a support of polyethylene terephthalate and a megnetisable layer containing about 40% by volume of $\gamma$-$Fe_2O_3$ with a Curie temperature approximately in the range of from 500–700° C., dispersed in a film-forming polyurethane as described, for example, in British patent specification 979,527.

This original tape is brought into contact with a copying tape which may have the same composition as the original tape with the exception that ferromagnetic chromium dioxide with a Curie temperature of 120° C. is used instead of the $\gamma$-$Fe_2O_3$.

Both tapes are wound, layer facing layer, onto a cylindrical element, the coefficient of expansion of which does not differ substantially from that of the tapes, e.g., a synthetic plastic roller. This package is heated in a heating chamber to a temperature of about 140° C. After cooling to room temperature, the original tape is separated from the copying tape. A copy is obtained in which the level at the medium sound frequencies is even stronger than that of the original record.

The process of the present invention is preferably performed with tape-like magnetic recording members consisting essentially of a magnetizable layer on a support. The support may consist of film-forming high polymeric compounds such as cellulose esters for example cellulose acetate or nitro cellulose, polystyrene, polycarbonates in particular of bis-hydroxy phenyl alkanes such as described, for example, in British patent specification 834,101, or polyesters in particular polyethylene terephthalates. The magnetizable layers suitable for the inventive process include those which essentially consist of a magnetizable compound dispersed in a film-forming binding agent. Suitable binding agents include polyurethanes, such as described in German Patent 814,225 or British patent specification 979,527, cellulose esters, polyvinyl chloride, waxes or natural high polymers, particularly proteins such as casein and the like. Suitable magnetizable compounds include ferromagnetic oxides of heavy metals in particular $\gamma$-$Fe_2O_3$ or chromium dioxide as described hereinbefore.

While it is preferred to utilize magnetizable layers as described above, it is also possible to apply magnetizable layers which consist of one or more ferromagnetic metals such as ferromagnetic alloys of nickel, iron or cobalt. Preferred are ferromagnetic alloys having a Curie point of between 50 and 220° C.

We claim:

1. A process for recording a sequence of magnetic signals on a magnetizable recording member, which member comprises a magnetizable layer containing a magnetizable compound including the steps of (a) heating the magnetizable recording member onto which the magnetic signal is to be recorded to a temperature of at least the Curie point of the magnetizable compound, (b) subjecting the magnetizable recording member while being kept at said temperature to the magnetic field of the magnetic signal to be recorded, and (c) cooling the magnetizable recording member to a temperature below the Curie point of the magnetizable compound while said member is under the action of the magnetic field of the magnetic signal.

2. A process according to claim 1 wherein the magnetizable compound is a chromium dioxide magnetizable compound.

3. A process as defined in claim 1, wherein the magnetizable compound has a Curie point of between 50 and 250° C.

4. A process as defined in claim 3, wherein the magnetizable compound is a tetragonal chromium dioxide.

5. A process for copying magnetic signals from an original magnetic recording member which original member comprises a magnetizable layer containing a magnetizable compound and carries the magnetic signal to be copied, onto a copying magnetic recording member comprising a magnetizable layer which contains a magnetizable compound the Curie point of which lies considerably below the Curie point of the magnetizable compound contained in the original magnetic recording member, including the steps of (a) placing in close contact the magnetizable layers of the original magnetic recording member and the copying magnetic recording member, (b) heating both magnetic recording members while kept in close contact to a temperature of at least the Currie point of the magnetizable compound of the magnetizable layer of the copying magnetic recording member, (c) cooling both magnetic recording members while still kept in close contact to a temperature below the Curie point of the magnetizable compound of the copying magnetic recording member, (d) separating the original magnetic recording member and the copying magnetic recording member from each other.

6. A process according to claim 5 wherein the magnetizable compound in the original magnetic recording member is $\gamma$-$Fe_2O_3$ and the magnetizable compound in the copying magnetic recording member is a chromium dioxide magnetizable compound.

7. A process according to claim 5 wherein the magnetizable compound in the original magnetic recording member has a Curie point between 500 and 700° C. and the Curie point of the magnetizable compound in the copying magnetic recording member is between 50 and 250° C.

8. A process according to claim 5 wherein both magnetic recording members while in close contact are heated to a temperature above the Curie point of the magnetizable compound contained in the copying magnetic recording member but below the Curie point of the magnetizable compound contained in the original magnetic recording members.

References Cited

UNITED STATES PATENTS

| | | | |
|---|---|---|---|
| 2,915,594 | 12/1959 | Burns et al. | 179—100.2 |
| 2,738,383 | 3/1956 | Herr et al. | 179—100.2 |

BERNARD KONICK, *Primary Examiner.*

A. I. NEUSTADT, *Assistant Examiner.*